(12) United States Patent
Otani et al.

(10) Patent No.: US 8,814,448 B2
(45) Date of Patent: Aug. 26, 2014

(54) COVER FOR PHOTOGRAPHING LENS DEVICE

(71) Applicant: FUJIFILM Corporation, Tokyo (JP)

(72) Inventors: Kazunori Otani, Saitama (JP); Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/166,473

(22) Filed: Jan. 28, 2014

(65) Prior Publication Data

US 2014/0140687 A1  May 22, 2014

Related U.S. Application Data

(63) Continuation of application No. PCT/JP2012/065843, filed on Jun. 21, 2012.

(30) Foreign Application Priority Data

Jul. 29, 2011  (JP) .................................. 2011-166491

(51) Int. Cl.
*G03B 17/00*    (2006.01)
(52) U.S. Cl.
USPC .......................................... 396/448; 396/439
(58) Field of Classification Search
USPC .......... 396/448, 439; 359/703–706, 827–830; D16/200, 211, 213
See application file for complete search history.

(56) References Cited

U.S. PATENT DOCUMENTS

| 4,567,526 | A | * | 1/1986 | Tsuchiya ..................... 348/357 |
| 5,155,597 | A | * | 10/1992 | Lareau et al. ................ 348/311 |
| 6,130,705 | A | * | 10/2000 | Lareau et al. ................ 348/144 |
| 2011/0058804 | A1 | * | 3/2011 | Ito et al. ...................... 396/439 |

FOREIGN PATENT DOCUMENTS

| JP | 7-99599 A | 4/1995 |
| JP | 2006-71956 A | 3/2006 |
| JP | 2006-215521 A | 8/2006 |
| JP | 2007-114421 A | 5/2007 |
| JP | 2008-111980 A | 5/2008 |
| JP | 2010-11200 A | 1/2010 |
| JP | 2011-124784 A | 6/2011 |

OTHER PUBLICATIONS

International Search Report, mailed Sep. 18, 2012, issued in PCT/JP2012/065843.

* cited by examiner

*Primary Examiner* — Clayton E Laballe
*Assistant Examiner* — Warren K Fenwick
(74) *Attorney, Agent, or Firm* — Birch, Stewart, Kolasch & Birch, LLP

(57) ABSTRACT

Even if a plurality of CPU boards are installed, removal of the boards is facilitated. A plurality of CPU boards are disposed on the inner side of the left side face of a photographing lens device cover, which has an opening and the shape of a hollow rectangular parallelepiped. When a lens device body is accommodated inside the photographing lens device cover, connectors formed on the photographing lens device cover are connected to respective ones of connectors formed on the lens device body. Communication between the CPU boards and the lens device body becomes possible. Since the CPU boards are disposed on the cover and not on the lens device body, the boards can be removed without disassembling the lens device body.

4 Claims, 7 Drawing Sheets

COVER FOR PHOTOGRAPHING LENS DEVICE

CROSS REFERENCE TO RELATED APPLICATIONS

This application is a Continuation of PCT International Application No. PCT/JP2012/065843 filed on Jun. 21, 2012 which claims priority under 35 U.S.C. 119(a) to Application No. 2011-166491 filed in Japan on Jul. 29, 2011, all of which are hereby expressly incorporated by reference into the present application.

TECHNICAL FIELD

This invention relates to a cover for a photographing lens device.

BACKGROUND ART

In a case where multiple circuit boards are disposed in a photographing lens device having the shape of a rectangular parallelepiped, arranging the boards so as to lie orthogonal to the longitudinal direction is conceivable. However, since a photographing lens device accommodates a lens barrel along the longitudinal direction, often multiple boards cannot be arranged orthogonal to the longitudinal direction. For this reason, there is a proposal in which the boards are arranged parallel to the inner wall surface of a camera housing (Patent Document 1), a proposal in which the boards are provided inside an exterior member (Patent Document 2), a proposal in which the boards are provided along an inner wall inside a cylindrical camera system (Patent Document 3), and a system in which the boards are provided on the side face of a rectangular column that has been formed inside a lens barrel (Patent Document 4). Further, there is a proposal for preventing the intrusion of noise due to a power shortage in a television lens device.

[Patent Document 1]: Japanese Patent Application Laid-Open No. 2011-124784

[Patent Document 2]: Japanese Patent Application Laid-Open No. 2010-11200

[Patent Document 3]: Japanese Patent Application Laid-Open No. 2008-111980

[Patent Document 4]: Japanese Patent Application Laid-Open No. 2007-114421

[Patent Document 5]: Japanese Patent Application Laid-Open No. 7-99599

In a case where repairs are necessary owing to a malfunctioning board, removing the malfunctioning board from a camera is difficult in an arrangement in which the boards are disposed inside the camera.

DISCLOSURE OF THE INVENTION

An object of the present invention is to facilitate board removal even if a plurality of boards have been installed.

The present invention provides a (rectangular) photographing lens device cover which accommodates a (rectangular) lens device body, characterized in that control circuits are mounted on respective ones of a plurality of boards each of which is independent, and the plurality of boards (among the plurality of boards, at least two or more have a common board configuration), which are connected together by network lines, are provided on an inner side of one wall face, further comprising, an opening portion formed in the one side face; and a lid portion, which is removably attached to the one side face so as to cover the opening portion, and on an inner side of which the plurality of boards are provided. These two portions may be openable and closable with respect to the opening portion about one edge of the opening portion.

According to the present invention, boards are not provided in a lens device body but are instead provided on the inner side of one side wall face of a photographing lens device cover accommodating the lens device body. Because the boards are provided on the cover for the photographing lens device, if a board malfunctions, the malfunctioning board can be removed comparatively simply by removing the accommodated lens device body from the cover for the photographing lens device.

Preferably, the photographing lens device cover is detachably connected to the lens device body electrically by network lines the number of which is smaller than the number of the plurality of boards. In particular, it is preferred that a connector be formed on each of the network lines the number of which is smaller than the number of the plurality of boards so that, by accommodating the lens device body, connectors formed on the lens device body and the connectors formed on respective ones of the network lines will be detachably connected electrically.

The one side face is openable and closable about one edge, by way of example.

BEST MODE FOR CARRYING OUT THE INVENTION

Figure 1:
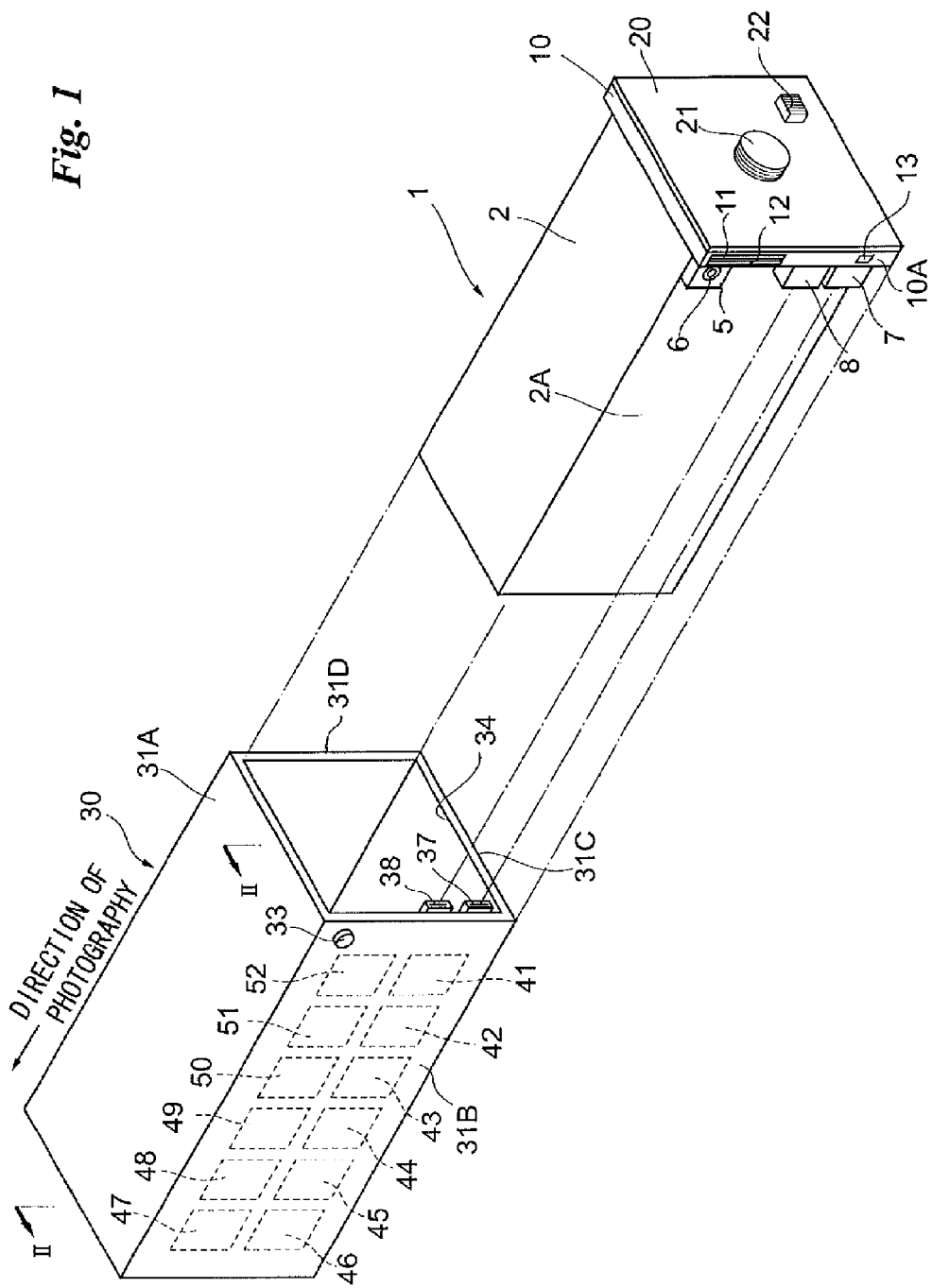
FIG. 1 is a perspective view of a photographing lens and photographing lens cover.

FIG. 1, which illustrates an embodiment of the present invention, is a perspective view of a lens device body 1 and a photographing lens device cover 30. The lens device body 1 and photographing lens device cover 30 are combined to form a photographing lens device. In FIG. 1, the lens device body 1 and the photographing lens device cover 30, which construct the photographing lens device, are seen from the back side. The side deeper into the drawing points in the direction of photography.

Overall the lens device body 1 has the substantially rectangular shape of a rectangular parallelepiped. A zoom lens and a focusing lens and the like are accommodated within the lens device body 1.

A mounting plate 10, which is substantially square when viewed from the front side, is fixed to the back face of the lens device body 1. Formed approximately at the center of the back face of the mounting plate 10 is a mount 21 for attaching a camera body. A male connector 22 for electrically connecting the camera body to the lens device body 1 is formed at the lower right of the mount 21. One side face 10A of the mounting plate 10 is provided with indicators 11 and 12 and with a connector 13 for connecting a virtual system.

An attaching member 5 is attached at the upper right of one side face 2A of a housing 2 of the lens device body 1. The attaching member 5 is formed to have a screw hole (female threads) 6. A mounting member formed to have a screw hole is attached to the other side face (not visible in FIG. 1) of the housing 2 of lens device body 1 at a position opposite the attaching member 5.

The photographing lens device cover 30 has the shape of a hollow parallelepiped. The back side is open (opening 34) and the opening is surrounded by upper, lower, left and right aluminum plates (although these need not necessarily be aluminum plates) 31A, 31B, 31C, 31D. The front face (the side deeper in the drawing of FIG. 1) on the side of the direction of photography is left open, although this is not visible in FIG. 1.

Protruding connectors 37 and 38 are provided at the lower left of the opening 34. The aluminum plate 31B of one side face is provided with a knob 33 at the upper-right portion thereof when viewed head on. The knob 33 is formed to have male threads. A knob (not shown) is formed on the side face 31D on the side opposite the aluminum plate 31B at a position opposite the knob 33. A plurality of boards 41 to 52 each of which is independent are disposed on the inner side of the aluminum plate 31B of one side face. Configurations 41 to 52 of these boards are substantially identical and CPUs are mounted on respective ones of the boards. The plurality of board 41 to 52 are connected by network lines.

If the photographing lens device cover 30 is mounted on the lens device body 1, the lens device body 1 is inserted into the photographing lens device cover 30 through the opening 34 of the photographing lens device cover 30. When the lens device body 1 is gradually inserted into the photographing lens device cover 30, the front end faces of the aluminum plates 31A, 31B, 31C and 31D of the photographing lens device cover 30 strike the mounting plate 10. The connectors 37 and 38 formed on the photographing lens device cover 30 then engage with the connectors 7 and 8, respectively, formed on the lens device body 1, so that the boards disposed on the inner wall of the photographing lens device cover 30 become electrically connected to the lens device body 1. By turning the knob 33 formed on the side face 31B and the knob formed on the side face 31D on the side opposite, the male threads formed on the knob 33, etc. mate with the female threads 6, etc. formed in the attaching member 5, etc. As a result, the photographing lens device cover 30 is detachably mounted on the lens device body 1.

When the photographing lens device cover 30 is to be removed from the lens device body 1 on which the photographing lens device cover 30 has been mounted, the knob 33 formed on the one side face 31B and the knob formed on the opposite side face 31D are loosened. The lens device body 1 is removed from the photographing lens device cover 30 by pulling the lens device body 1.

Figure 2:
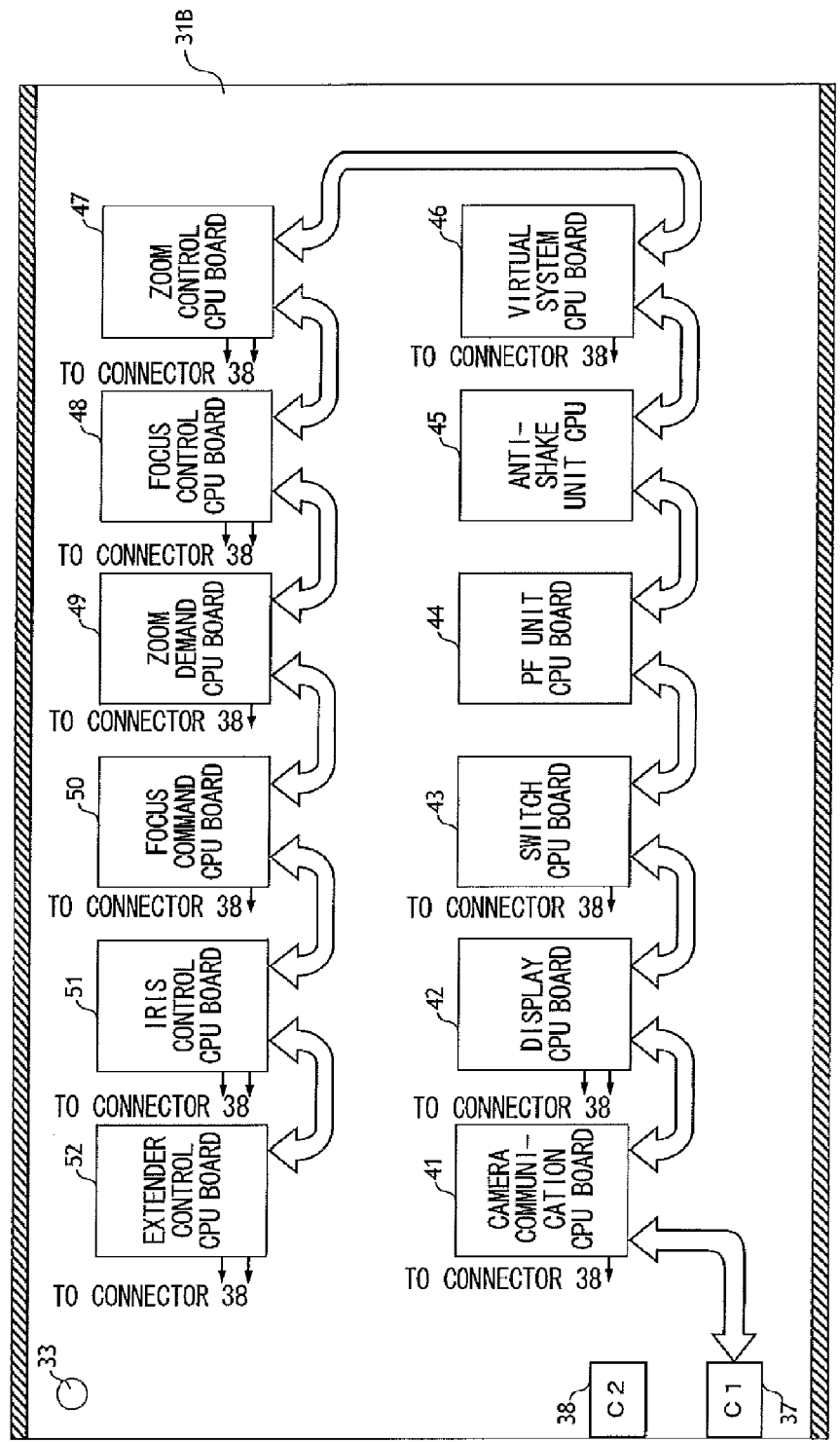
FIG. 2 is a sectional view taken along line II-II of FIG. 1.

FIG. 2 is a sectional view taken along line II-II of FIG. 1.

As mentioned above, the plurality of CPU boards 41 to 52 (mutually detachable), each of which is independent (a separate board), are disposed (fixed as by screws) on the aluminum plate 31B of the one side face. CPUs are mounted on respective ones of the CPU board 41 to 52. In a case where a number of processes are controlled by one CPU, a number of processes cannot be executed in parallel. According to this embodiment, however, since CPUs are mounted on respective ones of the boards, a number of processes can be executed at the same time by simultaneously driving the CPUs mounted on the respective boards.

A camera communication CPU board 41 communicates with the camera body. A display CPU board 42 controls the indicators 11 and 12. A switch CPU board 43 receives a signal from an external switch and carries out control that is in accordance with operation of the switch. PF unit CPU board 44 calculates the in-focus position of a focusing lens. An anti-shake unit CPU 45 controls the position of an anti-shake lens in order to correct for shaking. A virtual system CPU board 46 communicates with a virtual system, which executes computer graphics processing and the like. A zoom control CPU board 47 controls a zoom lens. A focus control CPU board 48 controls the focusing lens. A zoom demand CPU board 49 receives an externally applied zoom control signal. A focus command CPU board 50 receives an externally applied focus control signal. An iris control CPU board 51 controls an iris. An extender control CPU board 52 controls a lens that doubles focal length.

The camera communication CPU board 41 and display CPU board 42, the display CPU board 42 and switch CPU board 43, the switch CPU board 43 and PF unit CPU board 44, the PF unit CPU board 44 and anti-shake unit CPU 45, the anti-shake unit CPU 45 and virtual system CPU board 46, the virtual system CPU board 46 and zoom control CPU board 47, the zoom control CPU board 47 and focus control CPU board 48, the focus control CPU board 48 and zoom demand CPU board 49, the zoom demand CPU board 49 and focus command CPU board 50, the focus command CPU board 50 and iris control CPU board 51, and the iris control CPU board 51 and extender control CPU board 52 are connected to each other (bus-connected) by network lines. Further, the camera communication CPU board 41, extender control CPU board 52 and connector 37 are connected to one another by network lines. A main board (not shown) provided on the lens body 1 can communicate with any of the CPU boards 41 to 52 through the connector 37. Since the CPU boards 41 to 52 are connected by network lines, lines for communicating with the CPU boards 41 to 52 can be reduced. Although the connector 37 connected to the network lines is a single connector, two or more may be provided. Communication with the lens device body 1 and the like can also be achieved by providing connectors the number of which is smaller than the number (12) of CPU boards 41 to 52 disposed on the aluminum plate 31B. The number of network lines (number of connectors) can be reduced in comparison with a case where communication is had with the lens device body 1 or the like by forming connectors on a one-to-one basis with each of the CPU boards 41 to 52. All of the CPU boards 41 to 52 may be connected to a single network line and this single network line may be connected to the connector 37.

Further, since the one side face 31B on which the CPU boards 41 to 52 are disposed is an aluminum plate, it possesses a high thermal conductivity and exhibits high heat dissipation.

Although there is an arrangement in which not just network lines but other cables such as an RS232C cable are connected to the CPU boards, this will be described in detail later. The RS232C cables or the like in addition to the network lines communicate with the CPU boards 41, etc., via the connector 38.

Figure 3:
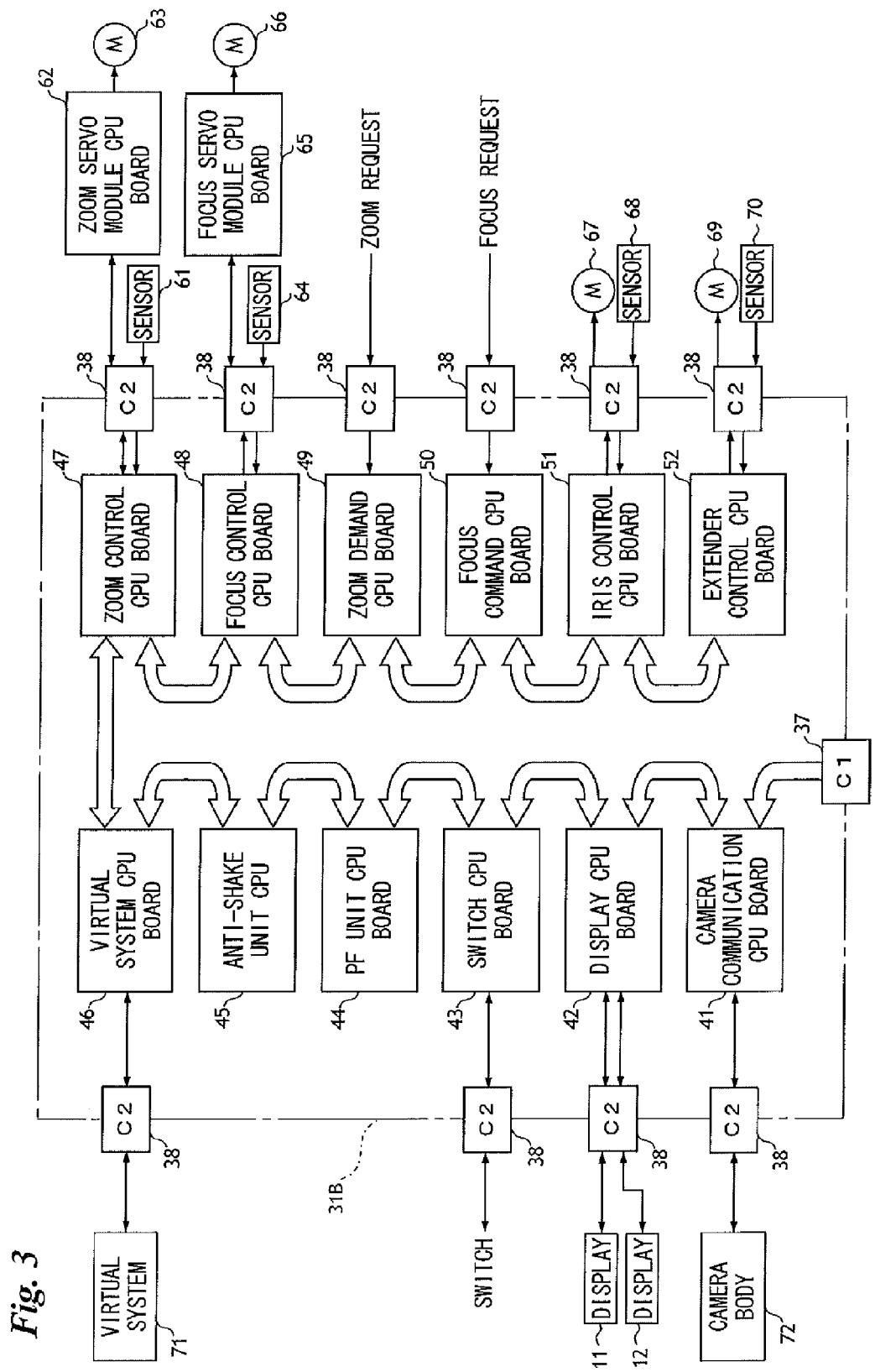
FIG. 3 is a block diagram illustrating the state of connection of a plurality of CPU boards.

FIG. 3 is a block diagram illustrating the state of electrical connection of the CPU boards 41 to 52, etc.

As shown in FIG. 2, the CPU boards 41 to 52 are connected together by network lines.

The camera communication CPU board 41, which communicates with a camera body 72 in accordance with the RS232C communication standard, is connected to the camera body 72 via the connector 38, lens device body 1 and connector 22. The display CPU board 42 is connected by a cable to the indicators (display units) 11 and 12 via the connector 38. The switch CPU board 43 is connected by a cable to a switch via the connector 38. The virtual system CPU board 46, which communicates with a virtual system 71 in accordance with the RS232C communication standard, is connected to the virtual system 71 via the connector 38, lens device body 1 and connector 13.

A signal output from a sensor 61, which detects the position of the zoom lens, is input to the zoom control CPU board 47 via the connector 38. Further, the zoom control CPU board 47 and a zoom servo module CPU board 62 communicate in accordance with the RS485 communication standard. The zoom servo module CPU board 62, which is in the form of an individual unit, is mounted in the photographing lens device. The lens device 1 itself is formed to have a connector (not shown), and the zoom control CPU board 47 and zoom servo module CPU board 62 communicate via this connector. A control circuit also is mounted on the zoom servo module CPU board 62 and a zoom motor 63 is controlled by the zoom servo module CPU board 62.

A signal output from a sensor 64, which detects the position of the focusing lens, is input to the focus control CPU board 48 via the connector 38. Further, the focus control CPU board 48 and a focus servo module CPU board 65 communicate in accordance with the RS485 communication standard. The focus servo module CPU board 65, which is in the form of an individual unit, is mounted in the photographing lens device. The lens device 1 itself is formed to have a connector (not shown), and the focus control CPU board 48 and focus servo module CPU board 65 communicate via this connector. A control circuit also is mounted on the focus servo module CPU board 65 and a focusing motor 66 is controlled by the focus servo module CPU board 65.

The zoom demand CPU board 49 communicates with external devices in accordance with the RS485 communication standard. The zoom demand CPU board 49 is connected to the connector 38. A zoom request signal applied from an external device is input to the zoom demand CPU board 49 via the connector 38. The entered zoom request signal is applied to the zoom control CPU board 47 from the zoom demand CPU board 49, whereby the zoom lens is controlled based upon control by the zoom control CPU board 47 so as to occupy a position in accordance with the zoom request signal.

The focus command CPU board 50 also communicates with external devices in accordance with the RS485 communication standard. The focus command CPU board 50 also is connected to the connector 38. A focus request signal applied from an external device is input to the focus command CPU board 50 via the connector 38. The entered focus request signal is applied to the focus control CPU board 48 from the focus command CPU board 50, whereby the focusing lens is controlled based upon control by the focus command CPU board 50 so as to occupy a position in accordance with the focus request signal.

A signal from a sensor 68, which detects the current f-stop number, is input to the iris control CPU board 51 via the connector 38. A signal transmitted from the camera body 72 for controlling the f-stop number is sent from the camera communication CPU board 41 to the iris control CPU board 51 via a network line. An iris motor 67 is controlled by the iris control CPU board 51 based upon this control signal received by the iris control CPU board 51, whereby the f-stop value is controlled.

A signal from a sensor 70, which detects the current position of the lens (extender) that doubles the focal length, is input to the extender control CPU board 52 via the connector 38. A signal transmitted from the camera body 72 or the like for controlling the extender is sent from the camera communication CPU board 41 to the extender control CPU board 52 via a network line. A motor 69 is controlled by the extender control CPU board 52 based upon this control signal received by the extender control CPU board 52, whereby the extender is controlled.

The above-mentioned sensors 61 and 64, iris motor 67, sensor 68, motor 69 and sensor 70 are incorporated inside the lens device body 1.

Network communication among the above-described boards is capable of utilizing CAN (Controller Area Network) communication.

Figure 4:
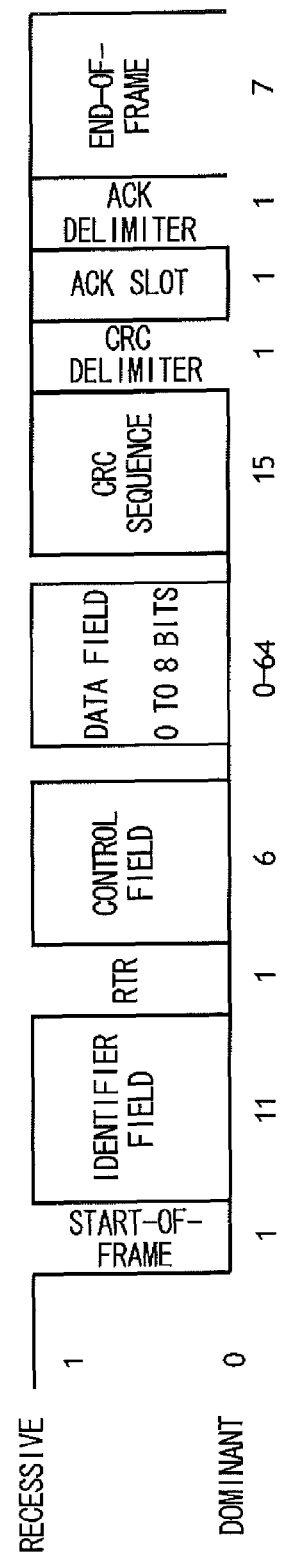
FIG. 4 illustrates the data structure of CAN communication.

FIG. 4 illustrates the structure of a data frame, which is the transfer format used to transmit data in CAN communication.

A data frame is either recessive or dominant. The numerals in each section indicate the numbers of bits. In a case where communication is not being carried out, a bus is recessive (the bus is idle).

A data frame contains a start-of-frame, an identifier field, an RTR, a control field, a data field, a CRC sequence, a CRC delimiter, an ACK slot, an ACK delimiter and an end-of-frame, and transmission is performed in the order mentioned.

The start-of-frame represents the start of the data frame and takes on the dominant state. A receiving-side CPU board (receiving node) is capable of synchronization as a result of the start-of-frame transitioning from bus-idle recessive to dominant.

The identifier field is used in order to identify data content or the transmitting-side CPU board (transmitting node). By detecting the content described in the identifier field, the receiving-side CPU board can determine whether this data frame is the data frame for its own use. The identifier field also decides the order of priority in communication arbitration.

RTR (Remote Transmission Request) is used in order to identify a data frame that transmits data and a remote frame that requests transmission of data. In the case of a data frame, RTR will be dominant. RTR also is used in communication arbitration in a manner similar to that of the identifier field.

The control field indicates how many bytes will be transmitted in the next data frame.

The data field is the data portion transmitted by the data frame.

The CRC (Cyclic Redundancy Check) sequence checks for data corruption at the time of a data transmission.

The CRC delimiter, which is a delimiter symbol representing the end of the CRC sequence, is a single bit fixed at the recessive state.

The ACK (Acknowledgement) slot is a field for verifying normal reception.

The ACK delimiter, which is a delimiter symbol representing the end of the ACK slot, is a single bit fixed at the recessive state.

The end-of-frame indicates the end of transmission or reception and is fixed at the recessive state.

In a case where data frames happen to be transmitted from multiple CPU boards simultaneously, communication arbitration is carried out. For example, if two data frames have been transmitted, the items of data described in the identifier fields of respective ones of the two data frames are compared bit by bit and priority for transmission is given to the data frame in which the data that indicates a discrepancy first is dominant.

In the above-described embodiment, the CPU boards 41 to 52 are independent CPU boards. If any board malfunctions, therefore, repair is completed merely by replacing the board. Repair can thus be achieved comparatively simply. Since the CPU boards 41 to 52 are disposed in the photographing lens device cover 30 and are not disposed in the interior of the lens device body 1, removal also is comparatively easy. Furthermore, since the CPU boards 41 to 52 are connected by network lines, the single connector 37 suffices as the connector connected to the network lines. The number of connectors can be reduced.

Figure 5:
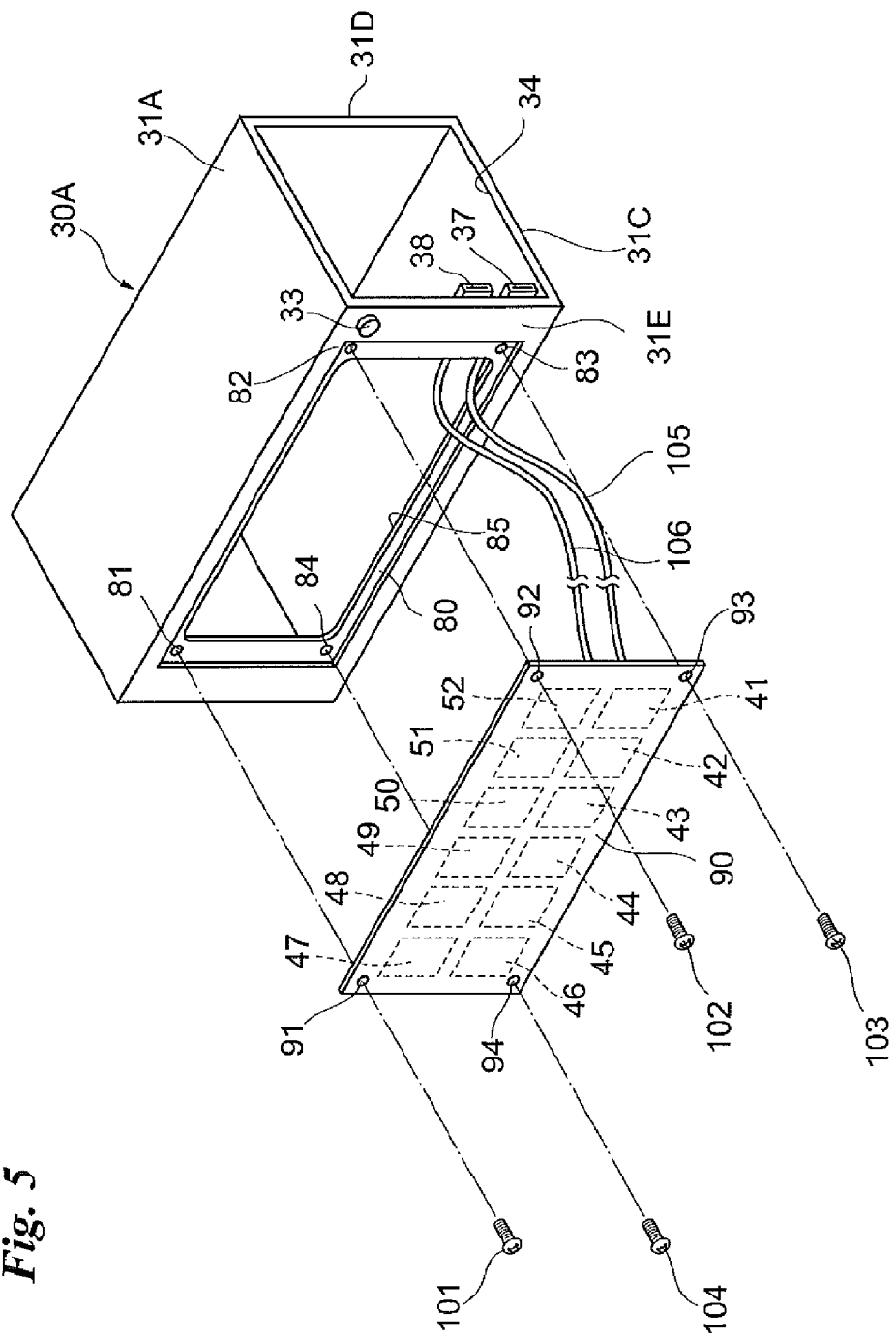
FIG. 5 is an exploded perspective view of a photographing lens cover.

FIG. 5, which illustrates another embodiment, is an exploded perspective view of a photographing lens device cover 30A. Components in FIG. 5 identical with those shown in FIG. 1 are designated by like reference characters and a description thereof is omitted.

One side face 31E of the photographing lens device cover 30A is formed to have a substantially rectangular opening 85 which opens substantially the entirety of the one side face 31E. A step portion 80, which is the result of a slight reduction in thickness from the surface of the one side face 31E, is formed surrounding the opening 85. The four corners of the step portion 80 are formed to have respective female-threaded screw holes 81, 82, 83 and 84.

A lid 90 that closes the opening 85 is removably attached to the photographing lens device cover 30A. The lid 90, which is a substantially planar rectangle, has a size approximately the same as that of the step portion 80 formed in the one side face 31E of photographing lens device cover 30A. The four corners of the lid 90 are penetrated by respective through-holes 91, 92, 93 and 94 through which are passed the threaded portions of male screws 101, 102, 103 and 104.

The above-described CPU boards 41 to 52 are disposed on the underside of the lid 90. The CPU boards 41 to 52 fit in their entirety within the opening 85 so as not to obstruct when the lid 90 closes the opening 85. As mentioned above, a network line 105 is connected to the connector 37 and a signal line 106 for communication in accordance with a communication standard such as RS232C is connected to the connector 38.

When the male screws 101, 102, 103 and 104 are passed through the through-holes 91, 92, 93 and 94, which are formed in the lid 90, and are screwed into the screw holes 81, 82, 83 and 84 formed in the step portion 80 of the left side face of photographing lens device cover 30A, the opening 85 is closed by the lid 90. If the male screws 101, 102, 103 and 104 are loosened, the cover will detach from the photographing lens device cover 30A.

Since the CPU boards 41 to 52 are disposed in the cover 90 that detaches from the photographing lens device cover 30A, replacement of a malfunctioning CPU board is facilitated.

Figure 6:
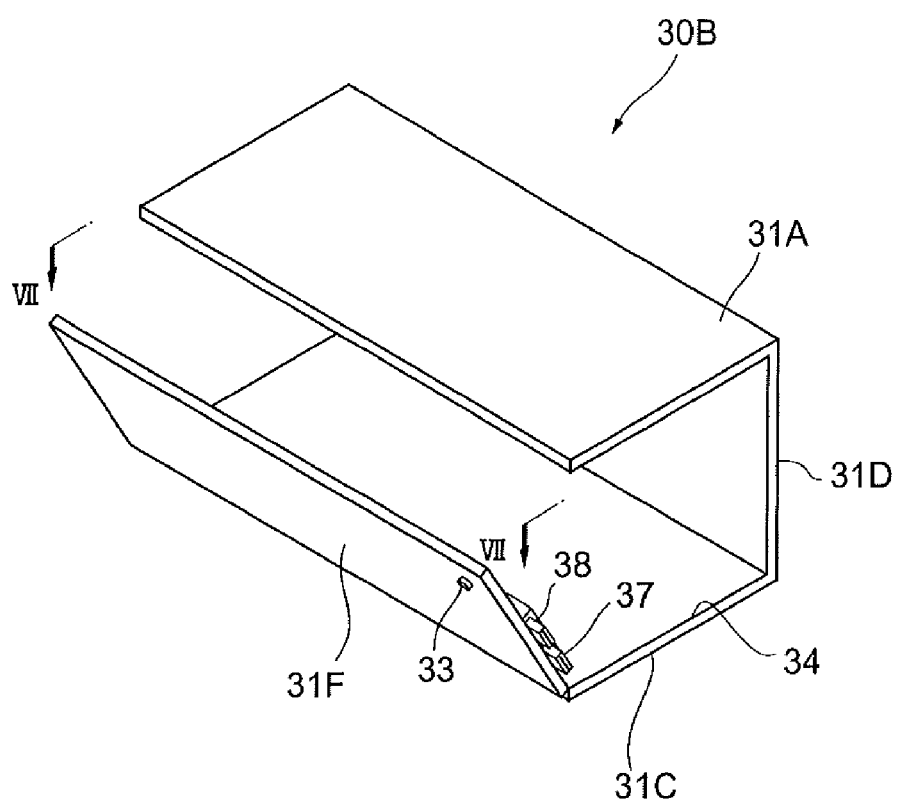
FIG. 6 is a perspective view of a photographing lens cover.
Figure 7:
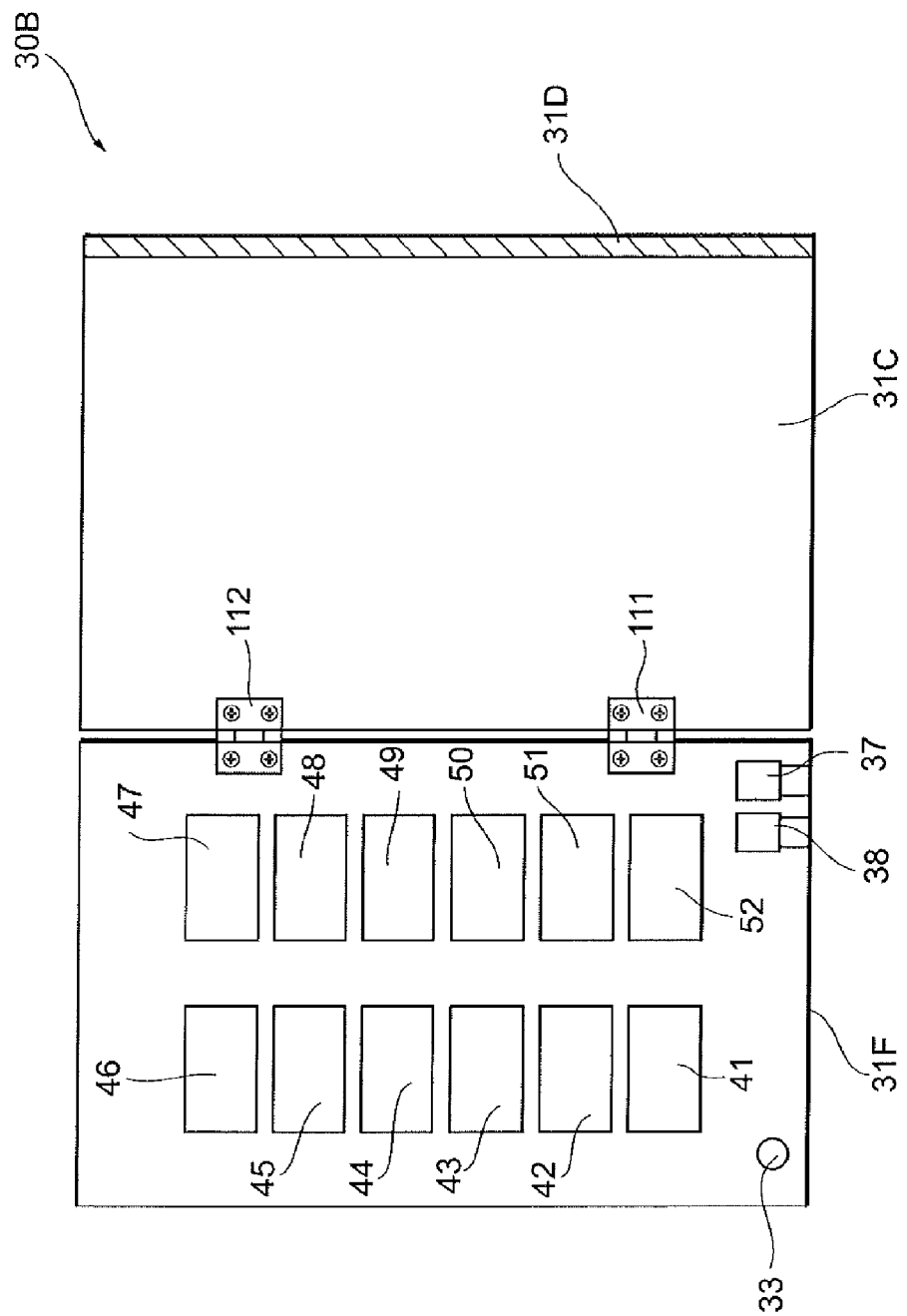
FIG. 7 is a sectional view taken along line VII-VII of FIG. 6.

FIGS. 6 and 7 illustrate another embodiment. FIG. 6 is a perspective view of a photographing lens device cover 30B, and FIG. 7 is a sectional view taken along line VII-VII of FIG. 6 when one side face 31F of the photographing lens device cover 30B has been opened. Components in these Figures identical with those shown in FIG. 1 or FIG. 5 are designated by like reference characters and a description thereof is omitted.

As shown in FIG. 6, the one side face 31F of the photographing lens device cover 30B is openable and closable about its lower edge. Bus lines, cables and the like that connect the CPU boards 41 to 52 are not shown in FIG. 6.

With reference to FIG. 7, the CPU boards 41 to 52 are disposed on the inner side of the one side face 31F, as mentioned above. The one side face 31F of the photographing lens device cover 30B and a lower face 31C of the photographing lens device cover 30B are attached by hinges 111 and 112 in a freely openable and closable manner.

When the photographing lens device cover 30B is mounted on the lens device body 1, one side face 31F is closed and the photographing lens device cover 30B is fixed to the lens device body 1 by the knobs 32 and 33. When the knobs 32 and 33 are loosened, the one side face 31F opens. When this done, the CPU boards 41 to 52 disposed on the inner side of one side face 31F become exposed. A malfunctioning CPU board can be replaced. In the embodiment illustrated in FIGS. 6 and 7, the one side face 31F itself is opened. However, as shown in FIG. 5, it may be arranged so that the lid 90 is fixed to one edge of the opening 85 and the lid 90 is opened.

In the photographing lens device cover 30A shown in FIG. 5 or in the photographing lens device cover 30B shown in FIGS. 6 and 7, the CPU boards can be replaced without removing the lens device body 1 from the photographing lens device cover 30A or 30B.

In the foregoing embodiments, the CPU boards 41 to 52 are arranged on the inner side of one side face of the photographing lens device cover 30, but the CPU boards may be arranged on a side face other than the one side face, such as on the upper face, the side face on the opposite side, or the lower face. The location where the above-described opening 85 is formed and the face that is freely openable and closable will change depending upon the location where the CPU boards 41 to 52 are placed.

CAN communication is utilized in the foregoing embodiments but a network technique other than CAN communication may be utilized as well. For example, PROFIBUS, CC-Link, Interbus and EC-NET, etc., can be also be utilized.

The CPU boards 41 to 52 are connected by network lines in the above-described embodiment (it goes without saying that transceivers, which are for communicating via the network lines as necessary, are mounted on the boards 41 to 52). However, these CPU boards 41 to 52 and network lines are detachably connected by connectors or the like.

Further, the camera communication CPU board 41, switch CPU board 43, virtual system CPU board 46, zoom demand CPU board 49 and focus command CPU board 50 are identically constructed, and the display CPU board 42, zoom control CPU board 47, focus control CPU board 48, iris control CPU board 51 and extender control CPU board 52 also are identically constructed. Furthermore, the PF unit CPU board 44 and anti-shake unit CPU 45 also are identically constructed.

Since the CPUs and communication circuits (transceivers), which are for communicating via the network lines, are mounted on the CPU control boards 41 to 52 as common parts, utilization of common parts in regard to these circuits can be achieved as well.

The invention claimed is:

1. A photographing lens device cover which accommodates a lens device body, wherein control circuits are mounted on respective ones of a plurality of boards each of which is independent, and the plurality of control boards, which are connected together by network lines, are provided on an inner side of one side face, further comprising:
   an opening portion formed in said one side face; and
   a lid portion, which is removably attached to said one side face so as to cover said opening portion, and on an inner side of which said plurality of boards are provided.

2. A photographing lens device cover according to claim 1, wherein the photographing lens device cover is detachably connected to the lens device body electrically by network lines the number of which is smaller than the number of said plurality of boards.

3. A photographing lens device cover according to claim 2, wherein a connector is formed on each of the network lines the number of which is smaller than the number of said plurality of boards; and
   by accommodating the lens device body, connectors formed on the lens device body and the connectors formed on respective ones of the network lines are detachably connected electrically.

4. A photographing lens device cover according to claim 1, wherein said one side face is openable and closable about one edge thereof.

* * * * *